United States Patent
Chen

(10) Patent No.: US 9,319,976 B2
(45) Date of Patent: *Apr. 19, 2016

(54) RADIO ACCESS TECHNOLOGY SELECTION IN TELECOMMUNICATIONS SYSTEM

(71) Applicant: ORANGE, Paris (FR)

(72) Inventor: Xiaobao Chen, Bath (GB)

(73) Assignee: Orange, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/330,537

(22) Filed: Jul. 14, 2014

(65) Prior Publication Data

US 2014/0323129 A1 Oct. 30, 2014

Related U.S. Application Data

(63) Continuation of application No. 12/682,306, filed as application No. PCT/EP2008/063567 on Oct. 9, 2008, now Pat. No. 8,781,469.

(30) Foreign Application Priority Data

Oct. 10, 2007 (EP) .................................. 07291231

(51) Int. Cl.
*H04W 4/00* (2009.01)
*H04W 48/18* (2009.01)
(Continued)

(52) U.S. Cl.
CPC .............. *H04W 48/18* (2013.01); *H04W 48/20* (2013.01); *H04W 60/00* (2013.01); *H04W 76/022* (2013.01); *H04W 88/06* (2013.01); *H04W 76/025* (2013.01); *H04W 92/00* (2013.01)

(58) Field of Classification Search
CPC ... H04W 48/18; H04W 48/20; H04W 76/022; H04W 76/025; H04W 88/06; H04W 92/00; H04W 60/00
USPC ............ 455/435.2, 435.3, 437, 438, 440, 449
See application file for complete search history.

(56) References Cited

U.S. PATENT DOCUMENTS 6,600,917 B1 7/2003 Maupin
6,754,482 B1 6/2004 Torabi
(Continued)

FOREIGN PATENT DOCUMENTS

EP 1 420 604 A1 5/2004
EP 1 739 991 A1 1/2007
(Continued)

OTHER PUBLICATIONS

Siemens AG et al., "Wireless Access Network Selection in Heterogeneous Network for Multimode Terminals," IP.com Prior Art Database Technical Disclosure, pp. 1-7 (Dec. 10, 2006).

*Primary Examiner* — Khai M Nguyen
(74) *Attorney, Agent, or Firm* — Drinker Biddle & Reath LLP

(57) ABSTRACT

A telecommunications system comprises a core network, an access control function and a plurality of radio access networks. Each radio access network communicates data to and from the mobile device in accordance with one of a plurality of radio access technologies. When a mobile device requests connection with the core network via a chosen radio access technology, the core network establishes a connection with the mobile device via at least one of the plurality of radio access interfaces. An access control function identifies the mobile device and in accordance with access control criteria generates an attach response indicating with which if any of the plurality of radio access technologies the mobile device may establish the connection and communicates the attach response to the radio access network via which the mobile device has requested the connection.

9 Claims, 3 Drawing Sheets

(51) Int. Cl.
*H04W 76/02* (2009.01)
*H04W 88/06* (2009.01)
*H04W 48/20* (2009.01)
*H04W 60/00* (2009.01)
*H04W 92/00* (2009.01)

(56) References Cited

U.S. PATENT DOCUMENTS 8,781,469 B2 * 7/2014 Chen ................ H04W 48/18
455/435.2

| | | | |
|---|---|---|---|
| 2005/0102424 | A1 | 5/2005 | Foll et al. |
| 2005/0159123 | A1 | 7/2005 | Lu |
| 2006/0133311 | A1 * | 6/2006 | Drevon ................ H04W 60/00 370/328 |
| 2006/0198347 | A1 | 9/2006 | Hurtta et al. |
| 2011/0255513 | A1 | 10/2011 | Karaoguz et al. |

FOREIGN PATENT DOCUMENTS

WO  WO 2005/114917 A1  12/2005
WO  WO 2007/042974 A1  4/2007

* cited by examiner

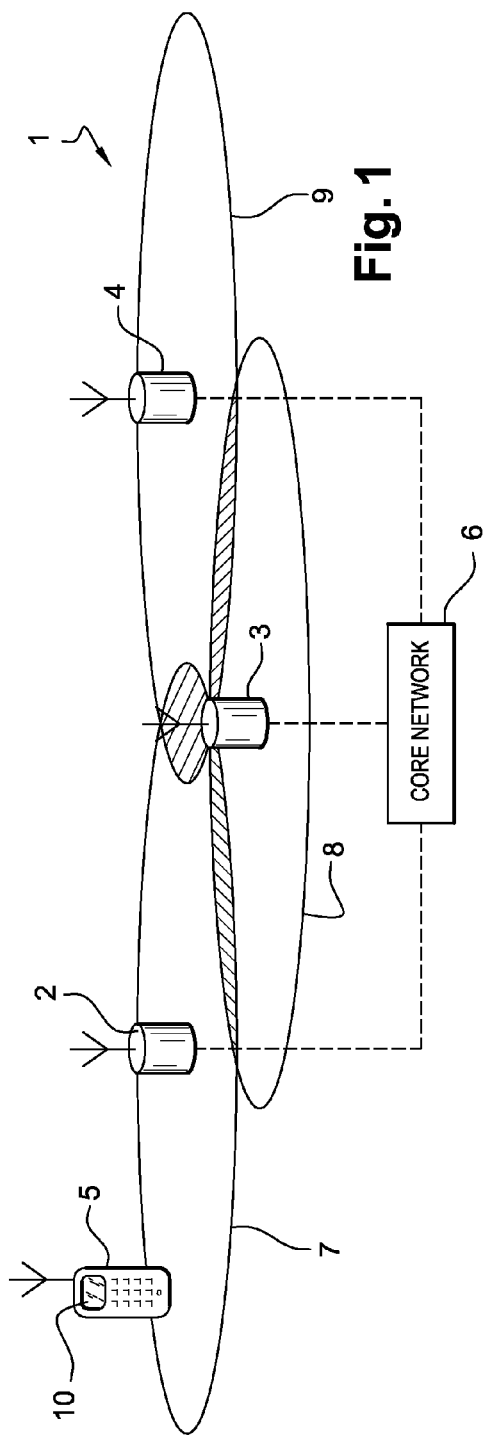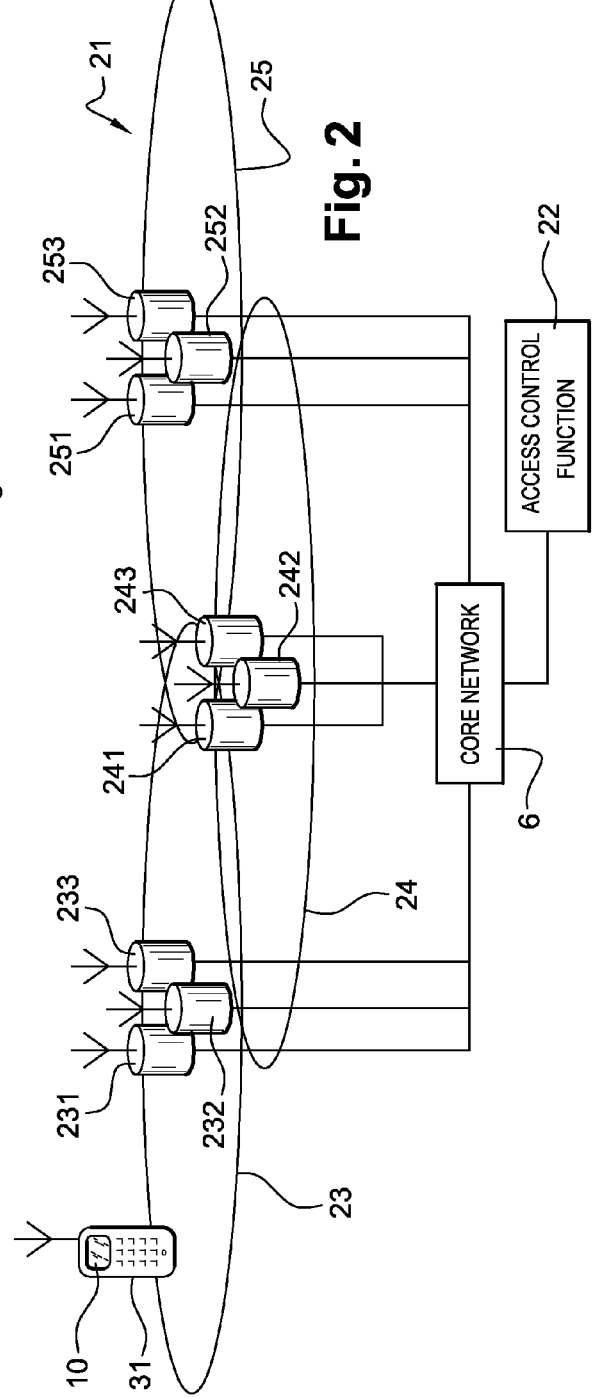

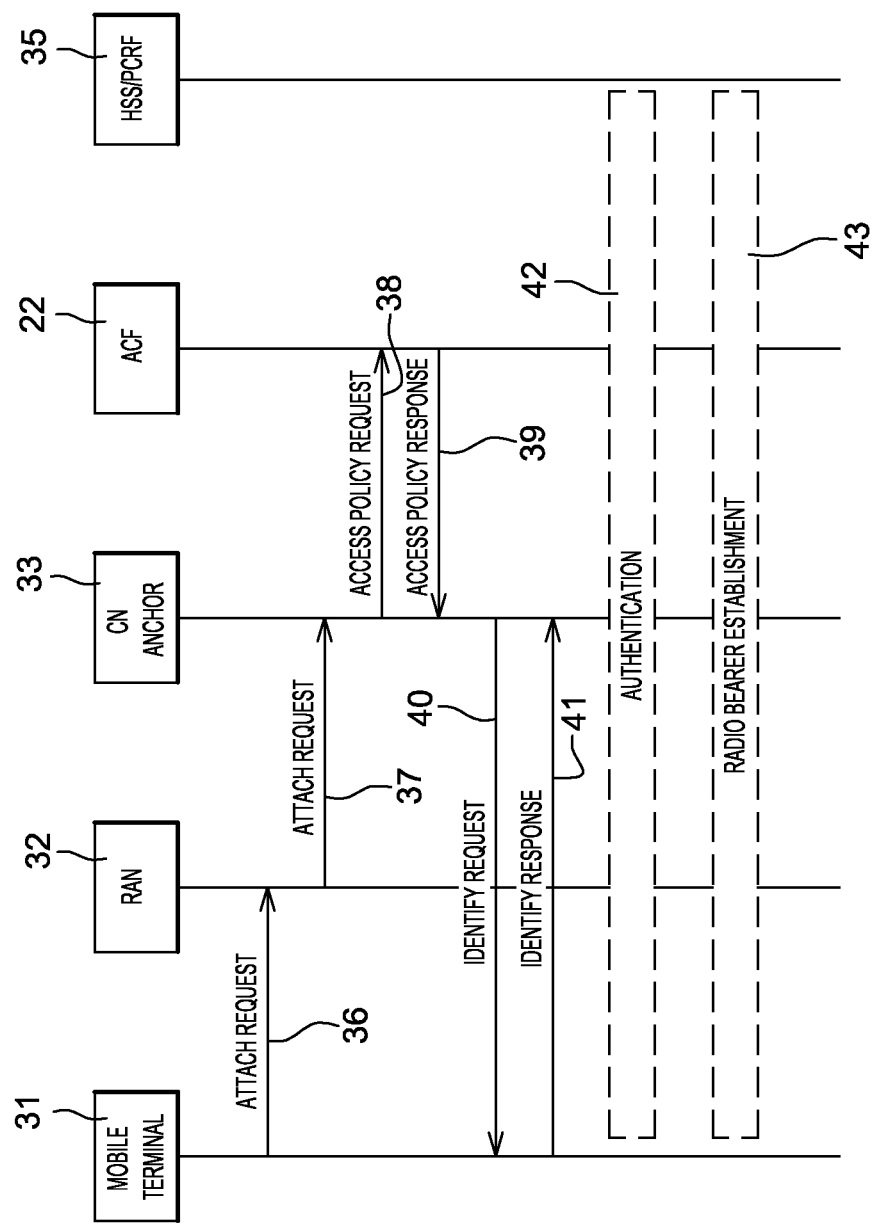

RADIO ACCESS TECHNOLOGY SELECTION IN TELECOMMUNICATIONS SYSTEM

CROSS-REFERENCE TO RELATED APPLICATIONS

This application is a continuation of U.S. patent application Ser. No. 12/682,306, now U.S. Pat. No. 8,781,469, which is the U.S. national phase of the International Patent Application No. PCT/EP2008/063567 filed Oct. 9, 2008, which claims the benefit of European Patent Application No. 07291231.4 filed Oct. 10, 2007, the entire disclosures of which are incorporated herein by reference.

FIELD

The present invention relates to telecommunications systems and methods operable to provide a facility for mobile communications to a mobile device. The present invention also relates to access control functions and mobile devices, which are arranged to provide a facility for controlling a radio access technology, which is used by the mobile devices to communicate.

BACKGROUND

The 3rd Generation Partnership Project (3GPP) is a telecommunications standards body formed of a number of organisations with telecommunications interests. The stated aim of 3GPP is to make a globally applicable third generation (3G) mobile phone system specification within the scope of the International Mobile Telecommunications-2000 project of the International Telecommunication Union (ITU). 3GPP has issued a set of standards (referred to as releases) each release adding further functionality to the existing releases. Release 98 and previous releases defined "second generation" GSM networks; Release 99 introduced "3G" UMTS networks; Release 4 introduced principally architectural changes including an all IP core network; Release 5 introduced IMS (IP Multimedia Subsystem) and HSDPA (High Speed Downlink Packet Access); Release 6 introduced integrated operation with Wireless LAN networks, HSUPA, (High Speed Packet Uplink Access) and further developments of IMS such as Push to Talk over Cellular (PoC); Release 7 (as yet finalised) will provide a number of further refinements particularly with respect to the WCDMA air interface, and Release 8 (expected in 2009) is being defined to introduce a number of significant changes including RAN Long Term Evolution with new access technologies and new core network architectures to support different access networks for both 3GPP defined access networks as well as non-3GPP access networks.

Due to these continuing enhancements of functions and definition of new access networks and architectures introduced in different releases issued by 3GPP, many current 3GPP compatible networks include multiple radio access technologies for providing voice and data services to mobile devices. Such radio access technologies include circuit GSM, GPRS, EDGE (Enhanced Data Rates for GSM), UMTS/UT-RAN RAN LTE and non-3GPP access technologies such as WLAN, Wimax and CDMA/CDMA2000.

SUMMARY

According to the present invention there is provided a telecommunications system operable to provide a facility for mobile communications to a mobile device. The system comprises a core network, an access control function and a plurality of radio access networks. Each radio access network is operable to communicate data (including voice data) to and from the mobile device in accordance with one of a plurality of radio access technologies. In response to an attach request from the mobile device requesting a connection with the core network via a chosen radio access technology, the core network is operable to establish a connection with the mobile device via at least one of the plurality of radio access technologies for communicating data to and from the mobile device. An access control function is operable to identify the mobile device requesting the connection with the core network and in accordance with one or more access control criteria to generate an attach response indicating with which if any of the plurality of radio access technologies the mobile device may establish the connection and communicate the attach response to a radio access network via which the mobile device has requested the connection.

Embodiments of the present invention allow an operator of a telecommunications network to exert control over the radio access technology with which a mobile device connects to a core network of the telecommunications system. As explained above, future public land mobile networks are likely to include a plurality of possible radio access technologies that a mobile device could use to communicate, although a core network to which the radio access technologies connect may be common. Exerting control over the radio access technology can provide a number of benefits. For example, network performance may be enhanced by basing access control criteria on traffic loading of certain parts of the telecommunications system. For example, if a first part of the network is experiencing a high traffic load such as a UMTS part, the access control function may override existing functionality at the radio access network level such as conventional cell reselection that would otherwise cause the mobile device to change affiliation/attachment from a relatively lightly loaded second part, such as a GSM part to the heavily loaded UMTS part. Thus even if a mobile device is in a coverage area, which would conventionally lead to the mobile device attaching to a UMTS radio access network and detaching from a GSM radio access network, the access control function can prevent the attachment or detachment from the GSM network to the UMTS network and the mobile device remains attached to the GSM radio access network. Thus, with an increasing number of radio access technologies available for use in mobile telecommunications networks, the present invention allows operators to exert more control over which radio access technologies are used and in what circumstances they are used. Therefore some of the more arbitrary allocation or very limited control of radio accesses found in conventional telecommunications systems is improved upon.

Additionally, a network operator may provide preferential subscriptions to its services using the access control function such that only certain subscribers are allowed access to certain preferential services/quality of service for example providing higher data bandwidths or guaranteed connections.

In other embodiments of the present invention user preferred or network defined radio access technology preferences may be stored on the mobile terminal thus allowing radio access technology selection to be performed at the mobile device. In other embodiments a user of the mobile terminal may manually select a radio access technology from a list of available radio access technologies.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 1 provides a simplified diagram of a conventional public land mobile network;

FIG. 2 provides a simplified diagram of a conventional public land mobile network adapted in accordance with an embodiment of the present invention;

FIG. 3 provides an illustration of the procedure for generating an attach request in accordance with the an embodiment of present invention, and FIG. 4 provides an illustration of the procedure for undertaking a cell selection/reselection in accordance with an embodiment of the present invention.

DETAILED DESCRIPTION

Figure 4:
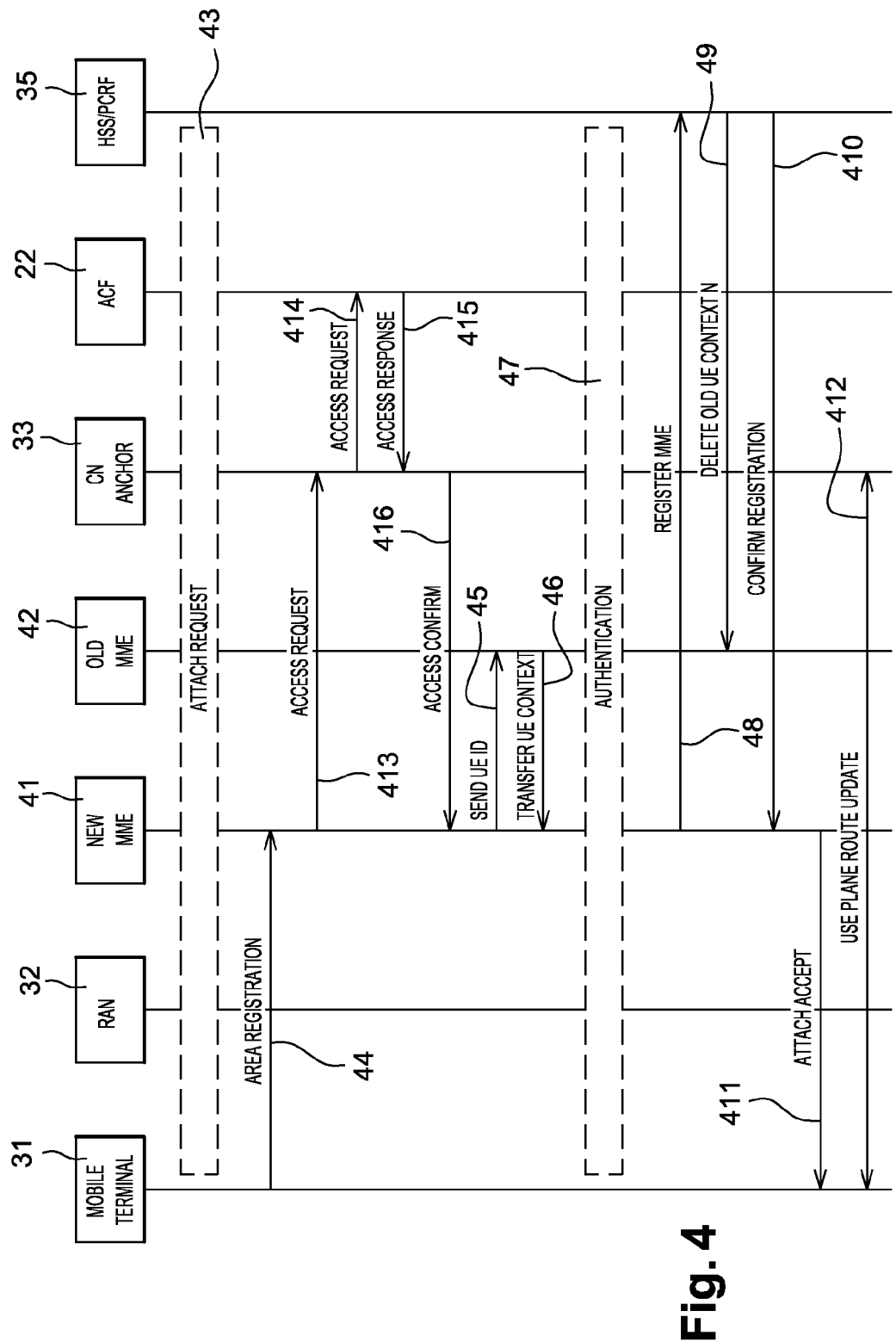

FIG. 1 provides a simplified diagram of a conventional public land mobile network (PLMN) 1. The network 1 includes base stations 2, 3, 4 via which a mobile device 5 (including a subscriber identity module 10) communicates data to and from a core network 6. Each of the base stations 2, 3, 4 provide a corresponding coverage area 7, 8, 9 within which radio communications via the corresponding base stations 2, 3, 4 is possible. When the mobile device 5 moves around within the network 1, communication with any given base station is only possible within the coverage area provided by that base station. This area is referred to as a cell. When the mobile device 5 and a base station have established a radio link, the mobile device 5 is said to be "camped" on the cell. In the case where a mobile device 5 moves from a first cell 7 to a second cell 8, the core network 6 oversees a handover of the mobile device 5 from a first base station 2 to a second base station 3. As can be seen in FIG. 1, there are some areas indicated by the hashed shading, where the cells 7, 8, 9 overlap. When the mobile device 5 enters one of these locations, or if for some reason a radio link between the mobile device 5 and the base station with which the mobile device 5 is currently communicating is broken, the mobile device will undertake a "cell selection/re-selection procedure". During this procedure the mobile device 5 searches for a suitable cell of the network 1 to camp on. Typically criteria the mobile device uses to determine a suitable cell to camp on to will depend on the radio conditions between the mobile device 5 and the base station providing the cell. For example if a mobile device finds itself in the coverage area of a first cell and second cell and the radio link shared with the first cell is deteriorating, the mobile device will seek to re-select to the second cell. During the cell selection/re-selection procedure various messages will be exchanged between the mobile device 5 and the core network 6. These messages include authentication, registration and provisioning messages. In some cases, for example roaming, the mobile device may move into an area covered only by cells from a second network (not shown in FIG. 1). In this case, if the appropriate roaming agreements exist between the first network 5 and the second network, then the mobile device 5 will camp on a cell of the second network.

The various processes and procedures involved in cell selection and cell re-selection for generic 3GPP compliant networks are explained in further detail in 3GPP TS 25.304. However, cell selection/re-selection is defined only in terms of selecting a new cell from either the same network or a new network with no reference to considerations as to what might be an appropriate/preferred radio access technology (RAT). Therefore in some embodiments of the invention, cell selection/re-selection procedures are adapted to include a radio access technology selection procedure.

FIG. 2 shows a simplified diagram of a network 21 arranged in accordance with an embodiment of the present invention. The network 21 includes an access control function 22 and each cell 23, 24, 25 includes a plurality of base stations 231, 232, 233, 241, 242, 243, 251, 252, 253. Each of the base stations in a given cell communicates data to and from mobile devices using a different radio access technology. However the base stations are all connected to a common core network 6. The diagram shown in FIG. 2 shows each base station operating within the coverage area of a single cell. However, it will be appreciated that in reality it would be expected that the actual extent of a coverage area provided by a base station using a given radio access technology may differ quite substantially from the coverage area of another base station using a different radio access technology. Furthermore, although in FIG. 2 each base station in a cell uses a different radio access technology it will be appreciated that in some cases a single base station may provide multiple radio access technologies.

In order to enable the selection of radio access technologies the various parts of a PLMN need to become "radio access technology aware". In other words the network elements must be provided with the means to differentiate between different radio access technologies and to communicate these differences. In order to facilitate this differentiation between different radio access technologies, in some embodiments of the invention each radio access technology available in a PLMN is assigned a code. The following table illustrates an example of services to be supported by various radio access technologies being assigned a code (RAT ID) according to the operators' service provisioning policies.

| Radio access technology with supported services | RAT ID |
|---|---|
| Emergency service only circuit switch/packet switch voice and data | 00 |
| Circuit switched voice (with/without data) | 01 |
| Pre-release 7 with packet switched voice | 02 |
| Release 7 with packet switched voice and data (HSPA) | 03 |
| Release 8 LTE (Long Term Evolution) with high speed data service only | 04 |
| Release 8 LTE with VoIP and high speed data service | 05 |
| Release 8 LTE with circuit switched voice and high speed packet data service | 06 |

The table above includes primarily 3GPP compatible radio access technologies however as will be appreciated it would be possible to include further non-3GPP radio access technologies such as WiFi, Bluetooth, WiMax etc.

In accordance with one embodiment there are provided a number of techniques which allow the radio access technology with which a mobile device communicates data to the core network to be selected in conjunction with the access control function 6. There are three principle mechanisms which can be used for radio access technology selection:

Manual RAT Selection

For manual radio access technology selection, a user of a mobile device provides a command directly through the mobile device indicating one of the available radio access technologies to use to connect to the core network. In a simple implementation the mobile device may provide the user with an indication of what radio access technologies are available and through an interface included in the mobile device the user can then select a desired radio access technology.

User Controlled RAT Selection

For user controlled radio access technology selection a user of a mobile device defines which radio access technologies are desirable to communicate with. However the user's radio access technology preferences are pre-designated and stored on memory within the mobile device. These preferences may be stored on a SIM (Subscriber Identity Module). In one embodiment the SIM includes a file:

User controlled PLMN Selector with Access Technology

This file includes a list of radio access technologies, corresponding RAT ID number and an indication as to which radio access technology is preferred by the user. This file may also include additional detail such as the radio access technology preferences of a user for given situations such as time and location. For example, when the mobile device is in a first location, the radio access technology preferred by the user may be different to the radio access technology preferred by a user in a second location. Additionally the radio access technology preferred by a user may change depending on the time of day. Both these examples may be influenced by variations in cost, signal quality or bandwidth due to changes in time and location.

Network Controlled RAT Selection

For network controlled radio access technology selection, the selection of the radio access technology is determined by the network. In a similar fashion to the user controlled selection, the network control of the radio access technology selection can be implemented by storing the necessary information in the mobile device, typically in the SIM. In one embodiment the SIM includes a file:

Operator controlled PLMN Selector with Access Technology

This file includes a list of radio access technologies and corresponding RAT ID numbers and an indication of the radio access technologies the mobile device is permitted to use. The file may also include additional detail setting out the radio access technologies permitted for given situations, which may relate to a variation in time and location.

In some embodiments, a mobile device may include a combination or all three selection techniques. In such cases, radio access technology selection via each technique may have an established precedence in respect of the other selection techniques. For example, a network controlled radio access technology selection may be given a higher priority than a user controlled selection mechanism and a manual radio access technology selection mechanism may have priority over both network and user defined radio access technology selection.

Once the radio access technology has been selected a request must be sent to the core network in order for a connection between the mobile device and the radio access technology selected to be established. FIG. 3 shows a flow diagram illustrating the exchange of messages between network nodes during the establishing of the connection between a mobile device and the core network using a given radio access technology. This is sometimes referred to an attach request procedure. FIG. 3 shows a representation of a mobile device 31 (operating in the network 21 shown in FIG. 2); a radio access network 32 (RAN) which refers to the part of the core network 6 which controls the relevant base station providing the radio access technology to the mobile device (in a UMTS network the RAN might be in the form of a RNC (Radio Network Controller) or in a GSM network the RAN may be in the form of a BSS (Base Station Sub-system)); a core network anchor 33 which is a part of the core network which controls bearer establishment which in some embodiments involves the selection and access control for the selected radio access bearer in question by the mobile device as well as the mobility between different base stations using the same or different access technologies, for example this may be a GGSN or a PDN; an access control function (ACF) 34 which is operable to provide access control to various radio access technologies; and an HSS/PCRF 35 (Home Subscriber Server/Policy Control Rule Function) for providing conventional HSS/PCRF functionality.

The Network Controlled RAT Selection is described in further depth below, the selection being done while the mobile device tries to connect to the network. Once the radio access technology has been selected using one of or a combination of the radio access technology selection mechanisms (Manual RAT Selection, User Controlled RAT Selection), the mobile device 32 will search for a suitable control channel on which to send data to the core network in order to establish a connection using the desired radio access technology. Once this has been accomplished the mobile device 31 sends an attach request message 36 to the RAN 32. Typically, this will include a UE ID (data identifying the mobile device 31) and a RAT ID corresponding to the selected radio access technology. The RAN 32 will then forward the Attach Request 37 to the core network anchor 33. Typically this attach request 37 will also include a UE ID and a RAT ID. Once the core network anchor 33 has received the Attach Request from the RAN 32, the core network will send an Access Policy Request message 38 to the access control function 22. The Access Policy Control Request will also include the UE ID and the RAT ID. Having received the Access Policy Control Request message 38, the access control function 22 is operable to determine if the requesting mobile device 31 is to be granted a connection with the radio access technology in question. This determination may be influenced by a number of factors. For example consideration may be given to current traffic loading of the network particularly the loading of different radio access technologies with respect to one another. Alternatively or additionally, reference could be made to a subscriber profile associated with the UE ID. From the subscriber profile a determination can be made as to what radio access technologies a user is permitted to access. Further factors influencing whether or not a mobile device is granted a connection via a given radio access technology might include the operators' provisioning of the services over a/some specific access technology, the time of the request or the current location of the mobile device. During this procedure the access control function 22 may refer back to other elements within the network such as an HSS or a PCRF 35 to obtain information relevant to the particular mobile device making the attach request and the access policy associated with the radio access technology in question.

Thus the access control function 22 compares the user's requested radio access technology with those which are allowable, and determines the access technology the mobile device should use in dependence upon the users request and control criteria, such as current network loading conditions etc.

Once the access control function 22 has determined whether or not a mobile device is to be granted a connection with the requested radio access technology, an access policy response message 39 is sent back from the access control function 22 to the core network anchor 33. If the access control function declines the request from the mobile device 31 the process ends at this point and an appropriate message may be sent back to the mobile device. However, assuming the access control function 22 grants the request from the mobile device 31, then upon receipt of the access policy response message 39, the core network anchor 33 sends an identity request message 40 to the mobile device 31. This message serves to confirm the claimed identity of the mobile device and confirm the attach request. The mobile device then sends an identity response message 41 back to the core network anchor. Following successful completion of the identity request and identify response process, the mobile device 31 and elements of the core network typically undertake an authentication process 42 and a radio bearer establishment process 43. As will be understood, these processes vary depending on the radio access technology in question and for the sake of simplicity are not illustrated further in FIG. 3.

In some embodiments the process outlined in FIG. 3 may not need to occur if all a given network's radio access policies are included in the SIM of the mobile device.

FIG. 4 shows a procedure for cell reselection adapted in accordance with an embodiment of the present invention. As discussed above, conventional cell selection/reselection processes rely on factors such as a change in radio conditions measured at the mobile device. However the present invention allows for cell selection/reselection to take factors relating to radio access technology into account. The initial exchange of messages in the cell reselection process corresponds to the attach request process 43 as illustrated in more detail in FIG. 3. Following the successful completion of the attach request procedure 43 the mobile device 31 sends an area registration message 31 to a new MME 41 The new MME (Mobility Management Entity) 41 is a generic term which refers to the network node currently managing the mobility of the mobile device 31. In a GPRS core network an example of an MME is a SGSN. The procedure shown in FIG. 4, illustrates the case for both inter and intra radio access technology cell selection/reselection, the only difference being that for an intra radio access technology the old MME 42 and the new MME 41 will be of the same type (i.e. belonging to the same radio access technology), whereas with an inter radio access technology cell selection/reselection the old MME 41 and the new MME 42 will belong to different radio access technologies. Once the mobile device 31 has sent an area registration message 44 (which will typically include a temporary ID assigned to the mobile device be the old MME 42 as well as the RAT ID to which the mobile device is moving or intending to connect) to the new MME 41, the new MME 41 sends an access request message 413 (including the UE ID and the RAT ID) to the CN Anchor 33. The CN Anchor 33 receives the access request message 413 and then sends an access policy request message 414 to the ACF 22. The CN Anchor 33 then receives an access policy response message 415 from the ACF 22 which sends an access confirm message 416 (including the RAT ID) back to the new MME 41. The old MME 42 and the new MME 42 exchange messages 45, 46, which confirm the ID of the mobile and transfer relevant data contexts. Following this message exchange an authentication process 47 is undertaken and upon successful completion messages 48, 49, 410 are exchanged between the HSS and the old and new MMEs 41, 42 in which the HSS is updated as to the handover of the mobile device 31. Finally, an attach accept message 411 is sent from the new MME 41 to the mobile device 31 and the necessary routing updates are communicated between the core network anchor 33 (for example a GGSN) and the mobile device 31.

Various modifications may be made to the embodiments herein before described. For example it would be possible to implement the present invention across more than one PLMN thus allowing mobile devices to roam. Each PLMN (a home network and visited network) could be provided with an access control function and a suitable interface defined allowing the access control functions to exchange information. This would enable access policies defined by a home network to be realised in a visited network. Furthermore, although the embodiments have been described largely in terms of 3GPP compatible mobile telecommunications networks, the principle of the invention would be equally applicable in networks operating in accordance with non-3GPP standards such as Mobile IP.

The invention claimed is:

1. A telecommunications system operable to provide a facility for mobile communications to a mobile device, the system comprising:
   a core network including a policy control function,
   an access control function, and
   a plurality of radio access networks,
   each radio access network operable to communicate data to and from the mobile device in accordance with one of a plurality of radio access technologies, and in response to an attach request from the mobile device requesting a connection via a chosen radio access technology with the core network, the core network is operable to establish a connection with the mobile device via at least one of the plurality of radio access technologies for communicating data to and from the mobile device, wherein
   the access control function is operable to identify the mobile device requesting the connection with the core network and to communicate with the policy control function; and,
   in accordance with one or more access control criteria, to generate an attach response indicating whether the mobile device may establish the connection with the chosen radio access technology and
   the core network is operable to communicate an attach response to the mobile device via the radio access network via which the mobile device has requested the connection;
   wherein the access control criteria includes access policy conditions defined by the policy control function.

2. The telecommunications system according to claim 1, wherein the radio access network is operable to establish a connection with the mobile device in accordance with the attach response generated by the core network.

3. The telecommunications system according to claim 1, wherein the mobile device is operable to generate the attach request in accordance with a list of preferred radio access technologies.

4. The telecommunications system according to claim 3, wherein the mobile device includes the list of preferred radio access technologies stored on a subscriber identity module.

5. The telecommunications system according to claim 3, wherein the list of preferred radio access technologies is defined by a user of the mobile device.

6. The telecommunications system according to claim 3, wherein the list of preferred radio access technologies is defined by an operator of the telecommunications system.

7. The telecommunications system according to claim 1, wherein the mobile device is operable to generate the attach request in accordance with a manual selection of the radio access technology by a user.

8. The telecommunications system according to claim 1, wherein the access control criteria includes traffic loading conditions within the telecommunications system.

9. The telecommunications system according to claim 1, wherein the access control criteria includes a quality of service associated with the mobile device.

* * * * *